(12) United States Patent
Frison et al.

(10) Patent No.: US 10,837,620 B2
(45) Date of Patent: Nov. 17, 2020

(54) LIGHTING DEVICE AND CORRESPONDING METHOD

(71) Applicant: OSRAM GmbH, Munich (DE)

(72) Inventors: Renato Frison, Chions (IT); Alberto Alfier, Vedelago (IT); Xiaolong Li, Montebelluna (IT); Luca Mascolo, Treviso (IT)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 16/478,484

(22) PCT Filed: Jan. 12, 2018

(86) PCT No.: PCT/IB2018/050203
§ 371 (c)(1),
(2) Date: Jul. 17, 2019

(87) PCT Pub. No.: WO2018/134711
PCT Pub. Date: Jul. 26, 2018

(65) Prior Publication Data
US 2019/0368684 A1 Dec. 5, 2019

(30) Foreign Application Priority Data

Jan. 17, 2017 (IT) .......................... 102017000004343

(51) Int. Cl.
*F21S 8/00* (2006.01)
*F21V 5/00* (2018.01)
(Continued)

(52) U.S. Cl.
CPC ................ *F21V 5/007* (2013.01); *F21V 5/08* (2013.01); *G02B 6/0073* (2013.01); *G02B 6/0075* (2013.01); *F21Y 2115/10* (2016.08)

(58) Field of Classification Search
CPC ......... F21V 5/007; F21V 5/08; G02B 6/0073; G02B 6/0075; G02B 6/0001; F21Y 2115/10; F21Y 2103/10
(Continued)

(56) References Cited

U.S. PATENT DOCUMENTS

2008/0239722 A1    10/2008  Wilcox
2012/0120676 A1 *  5/2012   Richardson .......... G02B 6/0045
                                                          362/555
(Continued)

FOREIGN PATENT DOCUMENTS

| CN | 101680622 A | 3/2010 |
| CN | 104718410 A | 6/2015 |
| TW | 201300702 A | 1/2013 |

OTHER PUBLICATIONS

International Search Report based on Application No. PCT/IB2018/050203 (4 pages) dated Feb. 20, 2018 (for reference purpose only).

(Continued)

*Primary Examiner* — Ali Alavi
(74) *Attorney, Agent, or Firm* — Viering, Jentschura & Partner MBB

(57) ABSTRACT

A lighting device, e.g. for wallwashing lighting applications, includes a linear array of light radiation emitters including a light radiation source, e.g. a LED source, a light guide member having a first end coupled with the radiation source and a second end to emit light radiation guided by the guide member along a guide axis, as well as an optical system to receive light radiation from the light guide member and project outgoing light radiation from the lighting device. The light guide members of the light radiation emitters in the array are arranged with their second ends aligned in a longitudinal direction of the array, and with their light guide axes lying in a common plane angled to a reference plane. The optical systems of the light radiation emitters in the
(Continued)

array produce outgoing light radiation beams having higher angles to said reference plane than the corresponding input beams.

20 Claims, 10 Drawing Sheets

(51) Int. Cl.
*F21V 5/08* (2006.01)
*F21V 8/00* (2006.01)
*F21Y 115/10* (2016.01)

(58) Field of Classification Search
USPC .......................................................... 362/147
See application file for complete search history.

(56) References Cited

U.S. PATENT DOCUMENTS

| | | | |
|---|---|---|---|
| 2012/0287668 A1* | 11/2012 | Richardson | F21V 29/00 362/602 |
| 2015/0285450 A1* | 10/2015 | Gommans | F21V 5/02 362/147 |
| 2016/0139316 A1* | 5/2016 | Speier | G02B 19/0066 362/607 |

OTHER PUBLICATIONS

Chinese office action issued for corresponding Chinese patent application CN 2018800069874, dated May 25, 2020, 4 pages and 6 pages translation (for informational purpose only).

Chinese search report issued for corresponding Chinese patent application CN 2018800069874, dated May 12, 2020, 2 pages and 2 pages translation (for informational purpose only).

* cited by examiner

FIG. 15
FIG. 16
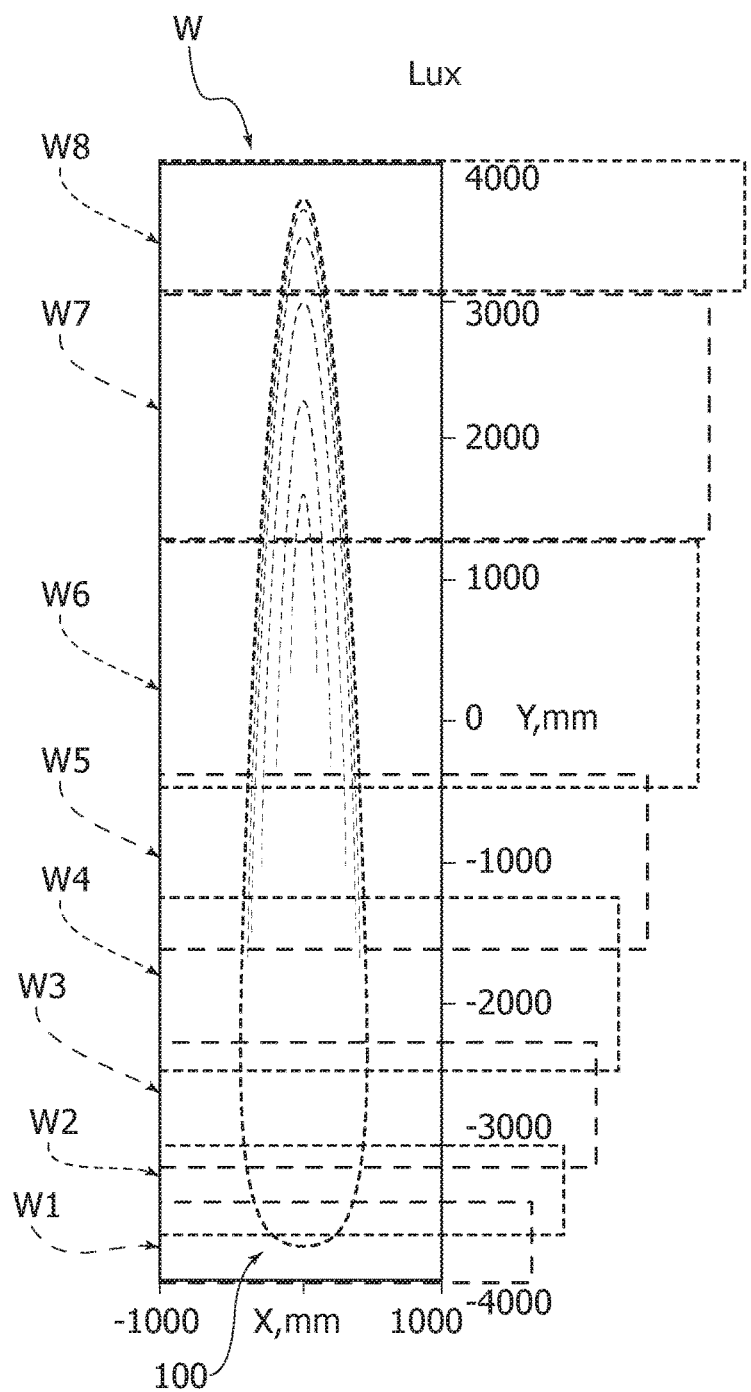
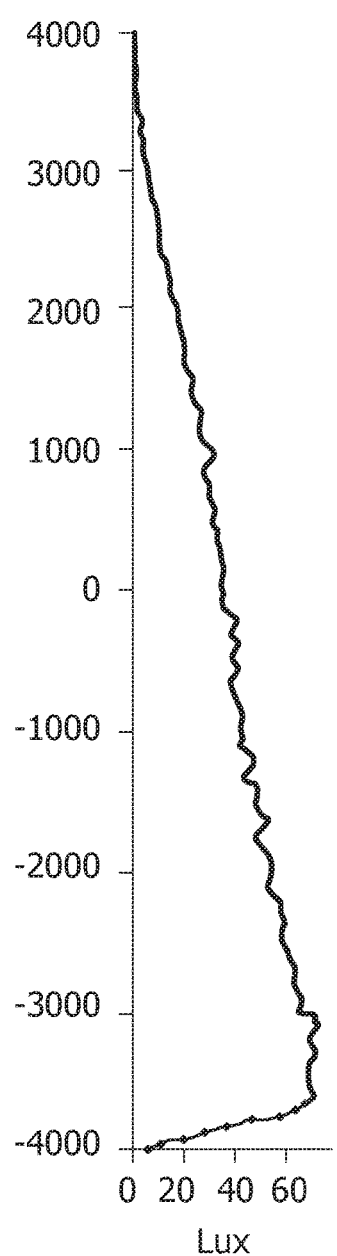

FIG. 17
FIG. 18
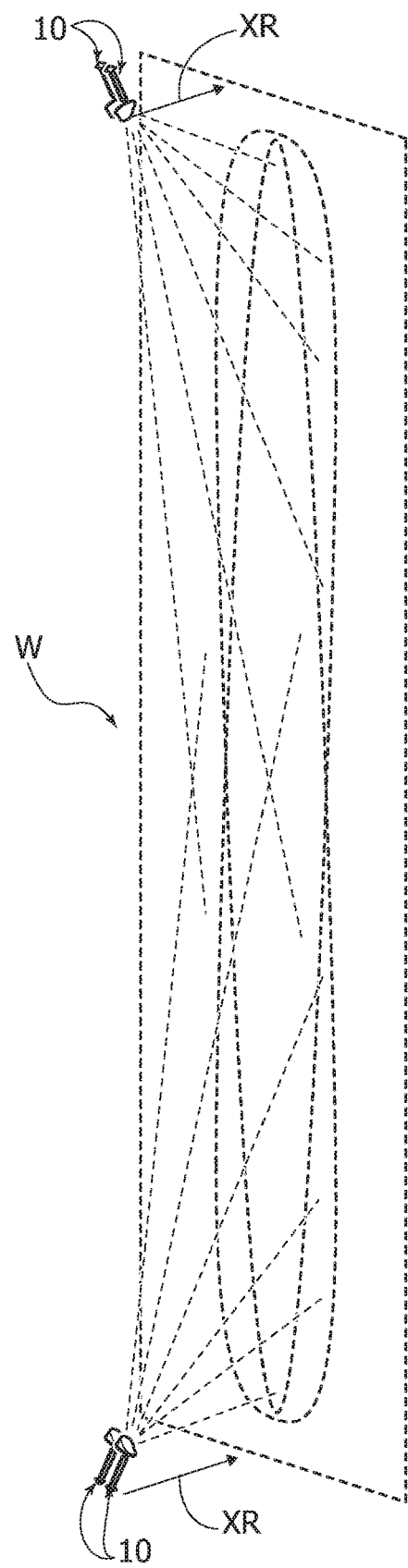
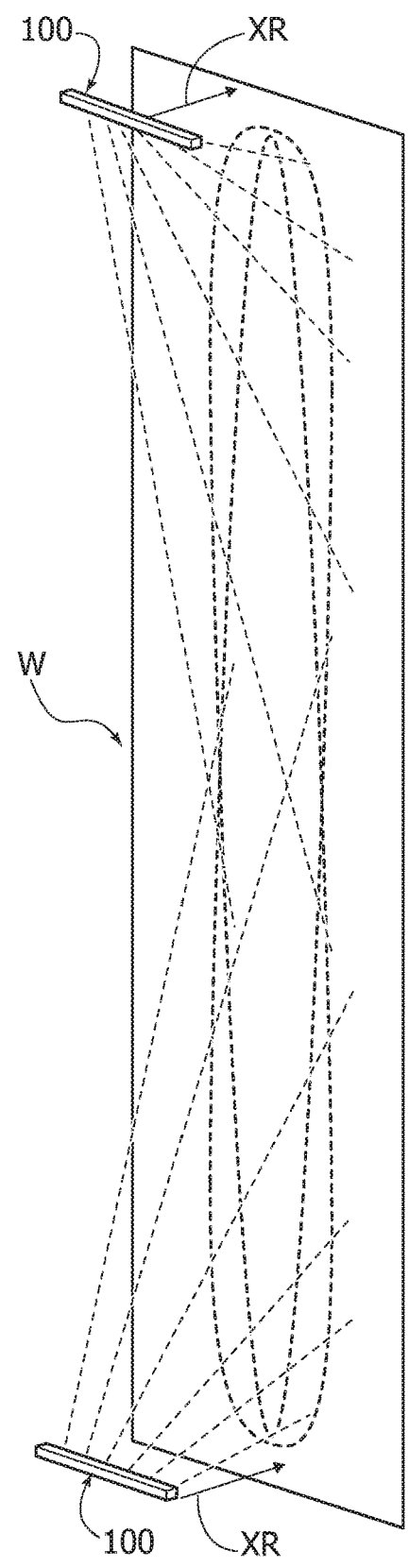

LIGHTING DEVICE AND CORRESPONDING METHOD

CROSS-REFERENCE TO RELATED APPLICATIONS

The present application is a national stage entry according to 35 U.S.C. § 371 of PCT application No.: PCT/IB2018/050203 filed on Jan. 12, 2018; which claims priority to Italian Patent Application Serial No.: 102017000004343, which was filed on Jan. 17, 2017; all of which are incorporated herein by reference in their entirety and for all purposes.

TECHNICAL FIELD

The present description relates to lighting devices.

One or more embodiments may refer to lighting devices adapted to implement a so-called wallwasher/wallwashing lighting, wherein a light radiation illuminates the extension of a surface, e.g. a wall.

BACKGROUND

On the market there are known various lighting solutions adapted to implement such a lighting action, by resorting either to refractive systems (e.g. employing lenses) or to reflective systems (e.g. employing reflectors).

Some solutions may include a simple optical system, such as a flat reflector surrounding a lambertian (e.g. LED) light radiation source having a wide radiation distribution.

Such a solution may have the disadvantage that the luminaire must be placed at a remarkable distance (up to 3 meters or more) from the illuminated surface, in order to obtain a good level of illuminance uniformity.

Other solutions employ a more complex dedicated optical system. In this case, too, a good illuminance uniformity may be obtained only by placing the lighting device far from the illuminated surface; otherwise, the illuminance distribution is more marked in some areas, e.g. near the floor, so that it is impossible to obtain a good uniformity.

In various known solutions, the presence (in the proximity of the light radiation source) of a spot where lighting is more evident leads to the possibility of obtaining a uniform illuminance distribution only by placing the source at a certain distance from the illuminated surface.

Moreover, various solutions may exhibit limitations as regards the extension of the region wherein a (more or less) uniform lighting may be obtained.

SUMMARY

One or more embodiments aim at providing improvements to the known solutions, by contributing to overcoming the previously outlined drawbacks.

According to one or more embodiments, said object may be achieved thanks to a lighting device having the features set forth in the claims that follow.

One or more embodiments may also concern a corresponding lighting method.

One or more embodiments may provide a wallwasher/wallwashing lighting device adapted to obtain a better distribution of the light radiation on an illuminated surface, the possibility being given of obtaining a high level of illuminance uniformity on a wall which may be exhibit a remarkable height (e.g. in the range from 4 to 16 meters).

One or more embodiments may enable omitting customized optics e.g. as regards output performances and/or radiation patterns at a certain height, depending on the specific application.

In one or more embodiments, a given lighting pattern may be obtained by combining a plurality of emitters adapted to employ light radiation guide members including e.g. rod integrators.

One or more embodiments may offer the possibility of adjusting the lighting pattern by acting e.g. on the tilting of the assembly including the radiation source and the light guide member, and/or on the particular configuration of the optical system (lens or reflector).

For example, in one or more embodiments, with two devices according to one or more embodiments which are located near the floor and near the ceiling of a given room, it is possible to illuminate, with a high level of uniformity, even a very high wall, although the devices are placed at short distance (e.g. at a distance between 0.75 and 2 meters) from the wall.

One or more embodiments may enable the achievement, as regards the radiation output from the optical system of the lighting device, one or more of the following advantageous features:

tilting of the output beam at approximately 10° in the planes C0-C180,

FWHM value of the beam amounting to approximately 10°, a substantially linear decrease of the illuminance radiation pattern from one end to the other end of the illuminated surface (e.g. from the floor towards the ceiling).

The latter feature offers the previously mentioned possibility of placing, at the opposite end of the surface, a similar device adapted to originate a specular illuminance distribution, the sum of both symmetrical distributions being adapted to originate a uniform ("flat") illuminance pattern throughout the extension of the illuminated surface.

A further advantage offered by one or more embodiments may consist in the optical system (e.g. lens) being "robust" as regards possible misalignments of the lighting device, e.g. with an illuminance uniformity which is substantially preserved even in case of possible different position (height) arrangements, at least as long as the position is included in the overall extension of the radiation pattern. If said condition is not satisfied, in one or more embodiments it is however possible to obtain a good illuminance uniformity by placing the lighting devices further away from the illuminated surface, without however attaining the very high values required in various conventional solutions.

By way of example, one or more embodiments enable the achievement of a good level of illuminance uniformity with lighting devices arranged 0.75 m. away from the illuminated surface (e.g. a wall) having an extension (wall height) ranging from 4 to 6 meters. If said extension (e.g. the height of the illuminated wall) is as high as 6-8 meters, a good uniformity may be achieved by placing the lighting devices at about 1 m away from the surface. In the case of even higher illuminated surfaces (e.g. walls having a height of 8-12 m. or 12-16 m), one or more embodiments enable the achievement of a good level of uniformity by placing the lighting devices respectively at a distance amounting to about 1.5 m and to about 2 m from the illuminated surface.

One or more embodiments may achieve a uniform illuminance distribution on a rather large surface (e.g. a wall) by using a plurality of lighting devices (e.g. six or more lighting devices) placed side by side and aligned in a direction parallel to the illuminated surface, said devices being arranged at a certain distance (e.g. a distance chosen on the basis of the previously exemplified criteria) from the surface hosting the various devices.

In this way it is possible to achieve a uniformity level higher than obtainable with conventional solutions also transversally of the illuminated surface.

BRIEF DESCRIPTION OF THE FIGURES

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which.

DETAILED DESCRIPTION

In the following description, various specific details are given to provide a thorough understanding of various exemplary embodiments of the present specification. The embodiments may be practiced without one or several specific details, or with other methods, components, materials, etc. In other instances, well-known structures, materials, or operations are not shown or described in detail in order to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

In the figures, reference 100 generally denotes a lighting device which may be employed e.g. in lighting applications which are currently known as wallwasher/wallwashing applications, i.e. such applications wherein it is desirable to light a certain surface with a light radiation having a distribution as uniform as possible.

Surface W may be e.g. a (planar) wall, which may have a rather large extension; as for the size, it is possible to refer to the values mentioned by way of example in the introduction to the present description. It will be appreciated, however, that the reference to said possible applications is not to be construed as limiting the embodiments.

In one or more embodiments, device 100 may comprise a linear array of light radiation emitters 10, which are equal or substantially equal to each other and are arranged side by side.

Figure 3:
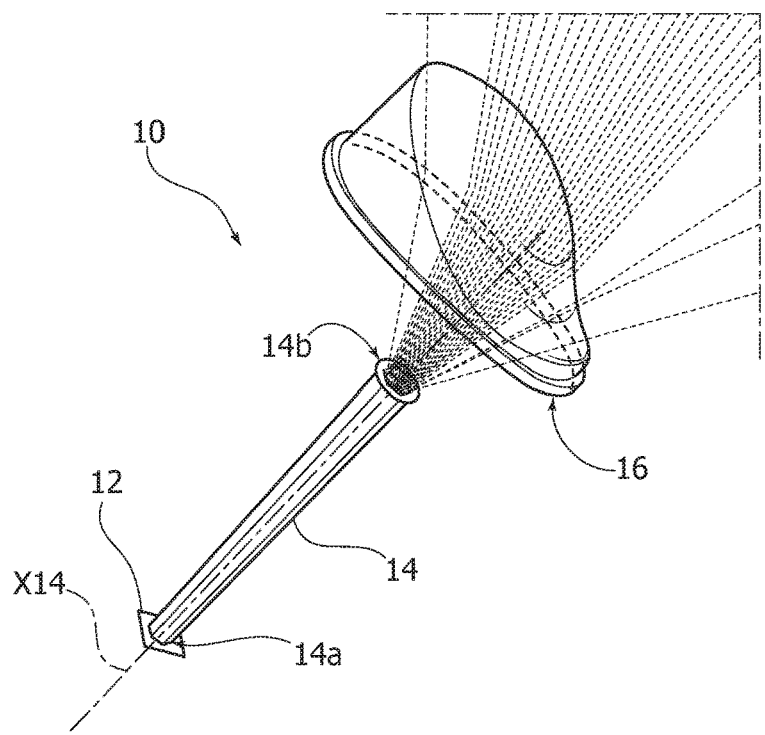
FIG. 3 shows possible features of one of the elements depicted in FIGS. 1 and 2, FIGS. 4 and 5 show possible features of one of the elements shown in FIGS. 1 to 3, FIG. 6 exemplifies possible geometrical features of a device according to one or more embodiments.

As exemplified in FIG. 3, in one or more embodiments each radiation emitter 10 may include:

an electrically-powered light radiation source 12 such as a solid-state light radiation source, e.g. a LED, optionally multi-coloured source (i.e. emitting in different colour ranges);

a light guide member (e.g. a rod or light tunnel) 14, which guides the light radiation emitted by source 12 from an input end 14a towards an output end 14b, and an optical system 16 (which may be either refractive or reflective; the Figures exemplify a refractive system, e.g. a lens) arranged facing the output end 14b of guide member 14, so as to receive input light radiation from guide member 14 and to project outgoing light radiation from lighting device 100.

In one or more embodiments, the light radiation emitters 10 may be arranged in a housing H (the profile whereof is shown by dot-and-dash lines in FIGS. 1 and 2 only) and they may be mounted therein—according to known criteria—in such a way that the light guide members 14 of the various emitters 10 included in device 100 are arranged with their longitudinal axes X14 (see FIG. 3) positioned side by side and being mutually coplanar.

In one or more embodiments, said longitudinal axes X14 may lie in a common plane extending transversally of device 100 (e.g. along the axis conventionally denoted as z-axis: see for example FIG. 2) and forming a given angle (e.g. of about 45°) to a reference plane XR which will be better detailed in the following.

Figure 8:
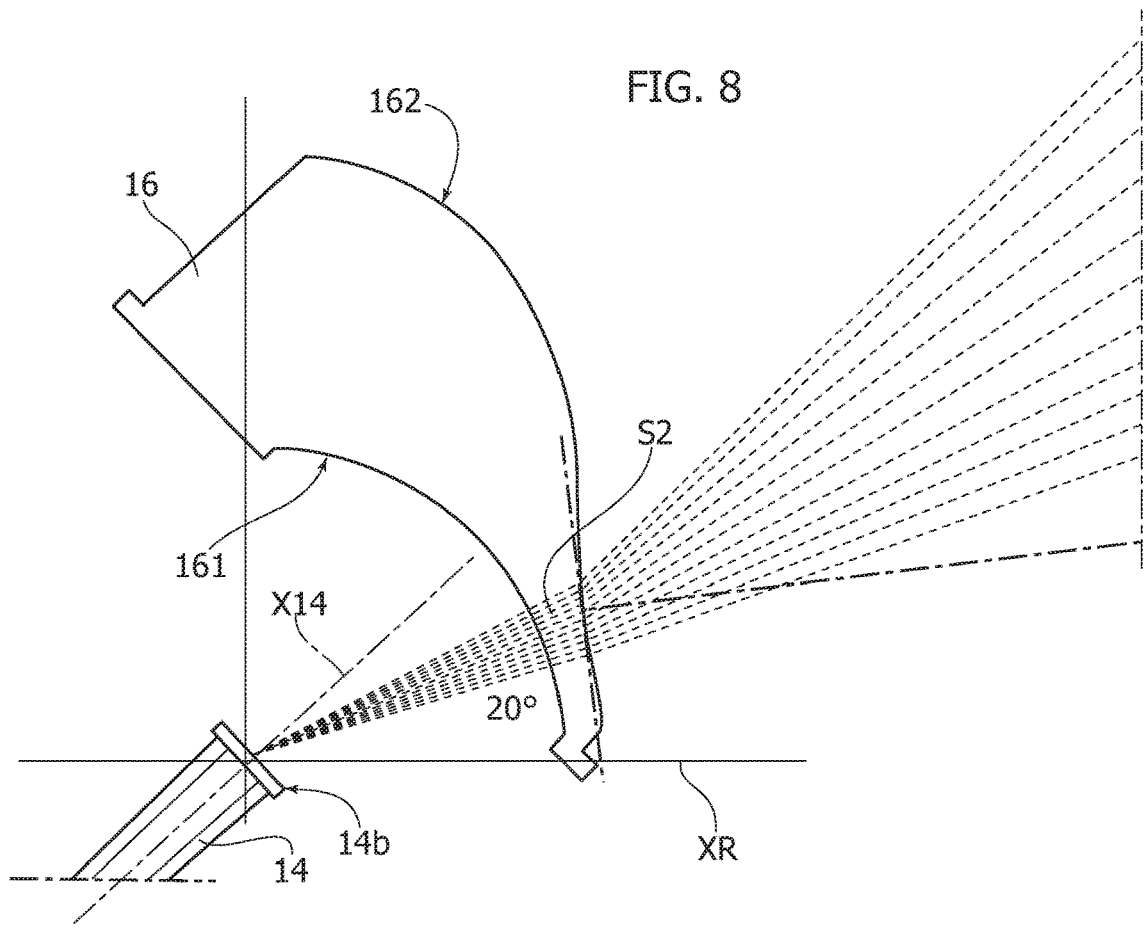
Figure 9:
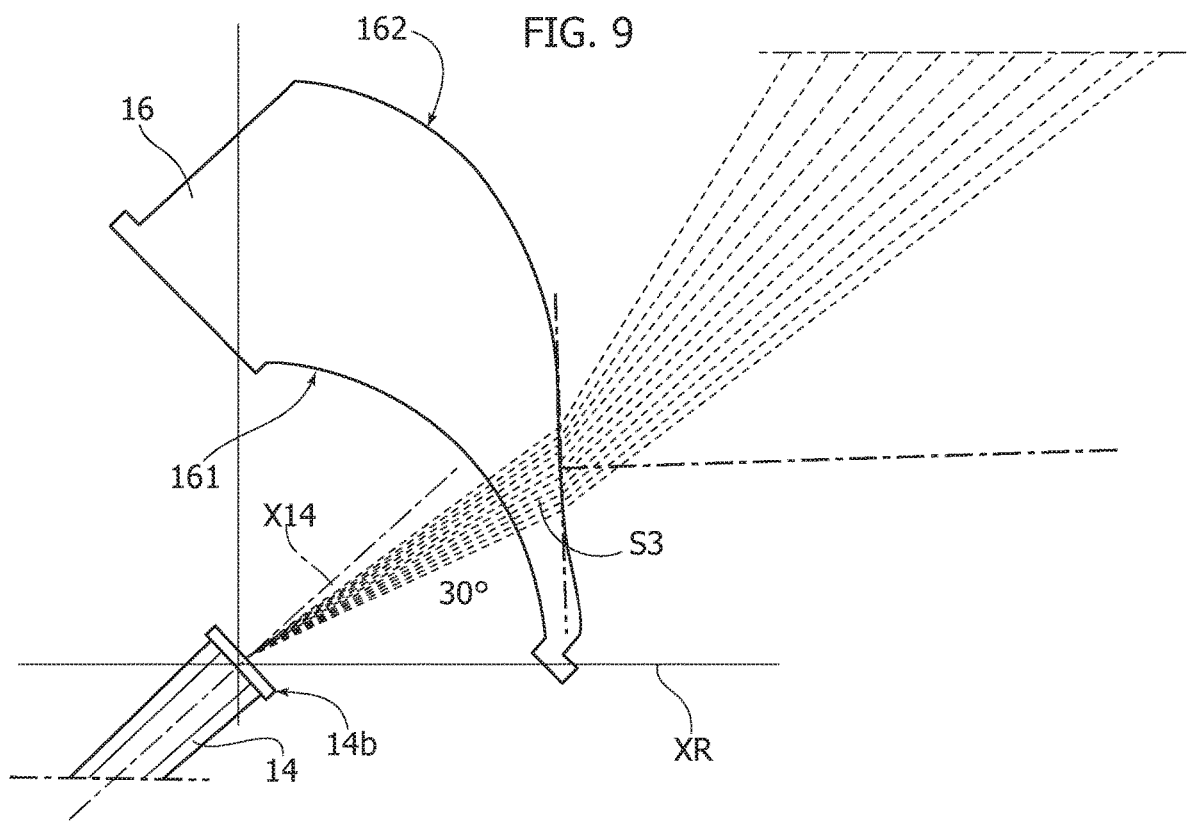
Figure 10:
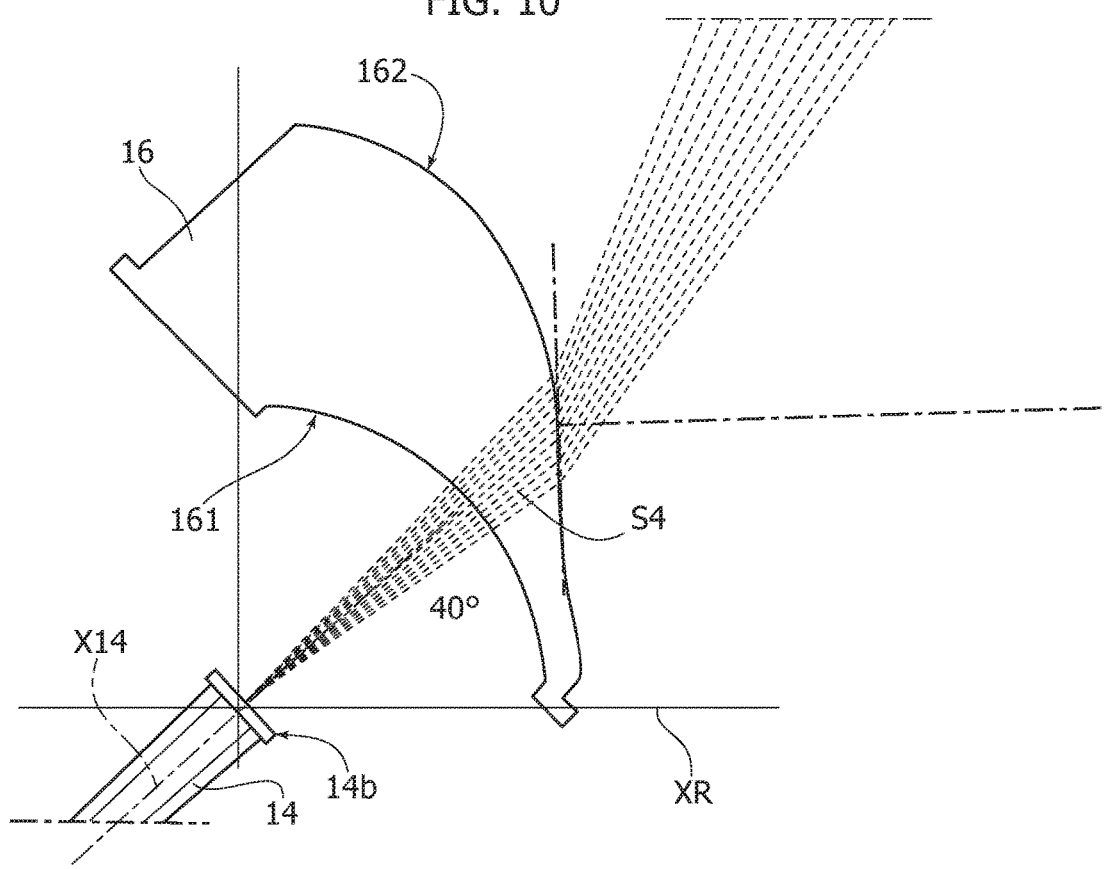
Figure 11:
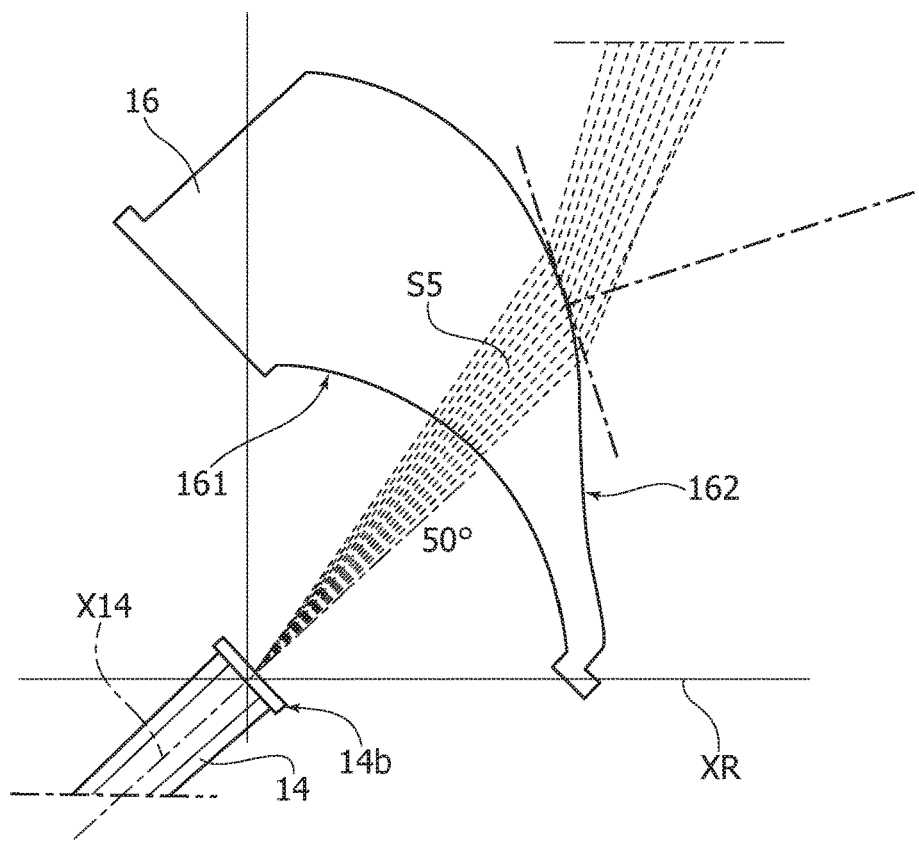
Figure 12:
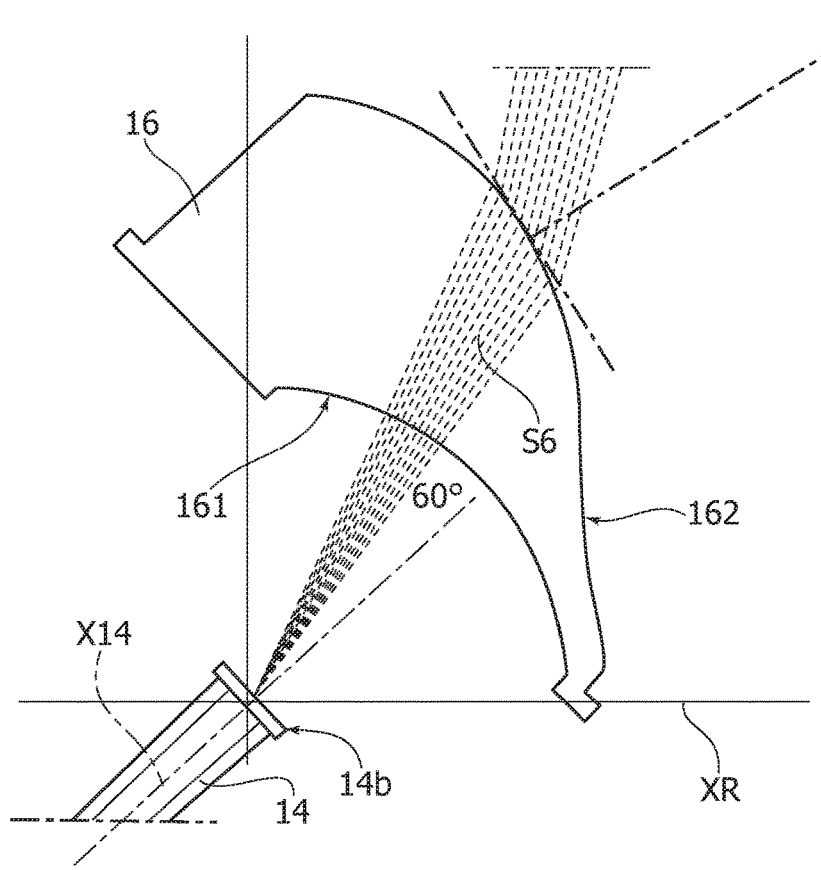
Figure 13:
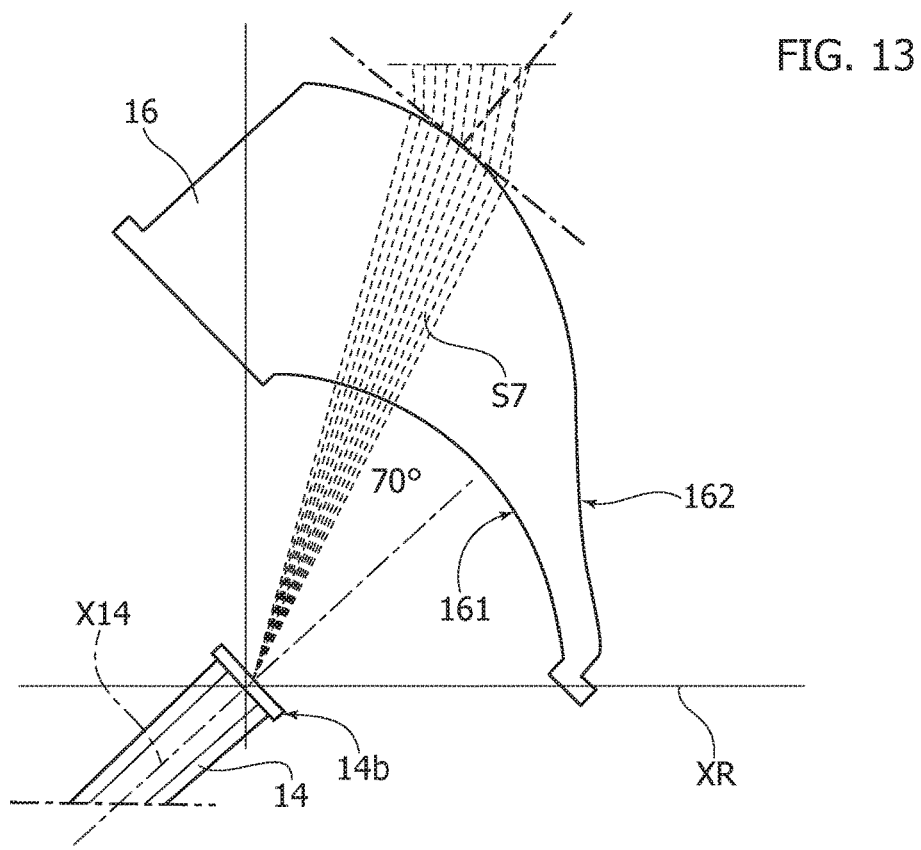

In one or more embodiments, device 100 has therefore a modular structure, the possibility being moreover given (as exemplified in Figures such as FIG. 8) of arranging a plurality of devices 100 facing an illuminated surface W according to the criteria discussed in the following.

In one or more embodiments, light radiation sources 12 may include small-sized LED sources (e.g. having a multi-coloured emission), which are coupled to the input end 14a of guide members 14, so as to project their light radiation mainly in the direction of longitudinal axis X14 (which, as previously discussed, may be tilted with respect to reference plane XR.

In one or more embodiments, optical system 16 may be configured so as to originate an output radiation pattern having asymmetrical features, the possibility being given of achieving a distribution having an axis tilted at about 10° and at about 0° in the planes conventionally denoted as C plane and orthogonal-C plane.

For the sake of simplicity, in the following reference will be constantly made to a refractive optical system, such as a lens 16; the person skilled in the art will however appreciate that the remarks about geometrical optics already made in the foregoing are applicable, according to criteria known in themselves, also to reflective optical systems, wherein a reflector is used instead of a lens.

Figure 1:
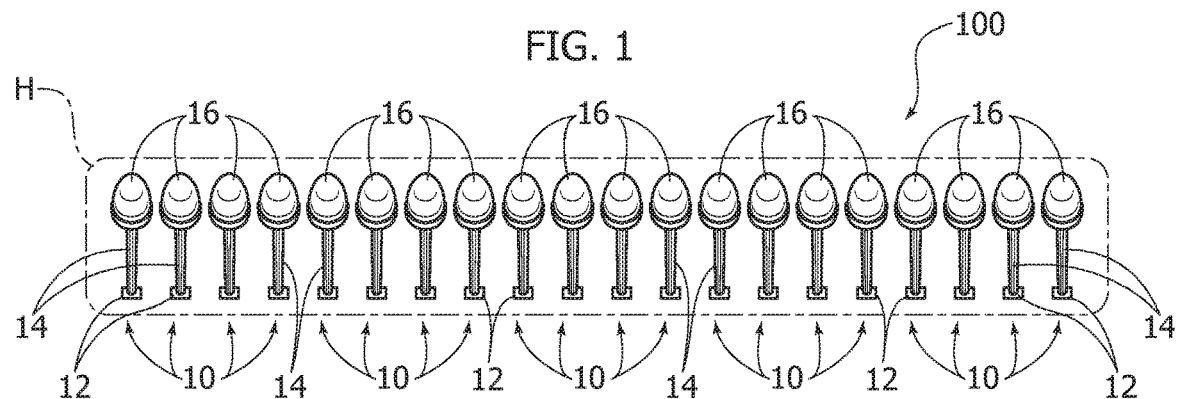
FIG. 1 is a side elevational view of a device according to one or more embodiments.
Figure 2:
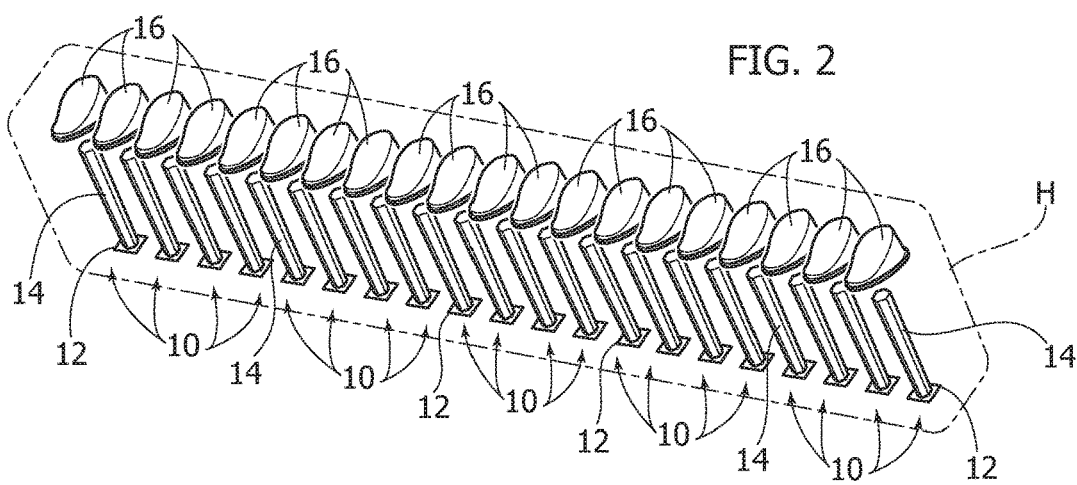
FIG. 2 is a perspective view of a device according to one or more embodiments.

In one or more embodiments, a device 100 as exemplified in FIGS. 1 and 2 may therefore include a given number of single emitters 10, so as to originate a sort of linear board having a length (along the direction denoted as z in FIG. 2) e.g. of about 1 meter, and being adapted to include a number of single emitters 10 ranging e.g. from 16 to 20.

Of course, such quantitative values are merely exemplary: in one or more embodiments, device 100 may be implemented either with longer or with shorter lengths, and may include virtually any number of single emitters 10. In one or more embodiments, said size and/or said number may therefore vary even in wide ranges, depending on the specific application and usage needs.

This also applies to the choice of the possible distance from the plane of the illuminated surface W (see for example FIGS. 17 and 18), which may be for example of about 1 m (the possibility being given of introducing variations, as previously described), with one or more devices 100 arranged with their extension direction z parallel to the plane of surface W and positioned (e.g. via brackets or other known support devices) so that the reference plane XR may be arranged orthogonally or substantially orthogonally to the plane of surface W.

Moreover, as previously stated, a plurality of devices 100 may be arranged at the opposed ends of surface W (as exemplified in FIGS. 17 and 18) and/or a plurality of devices 100 may be arranged side by side in mutual alignment, their axes Z being co-extensive, so as to provide a uniformly illuminated surface W which may also have a remarkable extension.

In one or more embodiments, the optical system 16 (exemplified herein as a lens) of each emitter 10 may be implemented in such a way as to "deflect" the light radiation received as input from guide member 14, by orienting it along the extension direction of surface W from the area nearest the mounting position of device 100. In this way a light intensity distribution may be originated having higher brightness values in proximity of device 100, and progressively lower values moving away from the region of surface W nearest device 100, according to an at least approximately linear law.

In this way, by using two devices 100 arranged at opposed ends of surface W (see FIGS. 17 and 18, wherein FIG. 17 shows the behaviour of a single emitter 10 and FIG. 18 shows the behaviour of a general device 100), said laws of illuminance distribution of the radiation coming from both units are summed, originating therefore an overall uniform distribution.

From the point of view of implementation, both guide member 14 (rod or tunnel) and optical system 16 (lens and/or reflector) may be made of a plastic material (e.g. polymethyl methacrylate, polycarbonate, etc.) or optionally of glass.

In one or more embodiments, at least some of such components may be made of a silicone material.

In one or more embodiments, said materials may be subjected to an anti-reflective coating treatment, so as to improve the system efficiency.

In one or more embodiments, the output surface of optical system 16 (e.g. the surface denoted as 162 in FIGS. 6 to 14) may be provided with a finishing such as a VDI or lenticular array finishing, so as to improve illuminance and colour uniformity.

In one or more embodiments, guide member 14 (which may be implemented as a rod or tunnel having reflective walls) may act in such a way as to impart further uniformity to the distribution of the light radiation emitted by light radiation source 12, e.g. by enhancing a mixing of the light radiation from different areas of the emitting source.

In one or more embodiments, member 14 (irrespective of the implementation thereof) may have a polygonal (e.g. triangular, rectangular, square or hexagonal) cross section.

It was ascertained that such polygonal section may reveal itself more efficient than, for example, a circular cross section. Moreover, it was ascertained that also the choice of the number of sides of the polygonal profile may have a certain influence: e.g. a triangular, rectangular, square or hexagonal cross section support the mixing effect to a greater extent than e.g. a pentagonal cross section.

In one or more embodiments, guide member 14 may have an overall tapered shape, diverging from input 14a to output 14b, i.e. with a section area increasing from input end 14a (coupled to source 12) towards output end 14b (coupled, e.g. at a certain distance, to optical system 16).

In one or more embodiments, the tilting of guide member 14—and correspondingly, of the emission surface of source 12 and of optical system 16—with respect to reference plane XR by a given angle (e.g. at 45°, such value being however non-limiting), leads to the outgoing light emission from device 100 being already oriented in the extension direction of surface W, e.g. when device 100 is arranged having reference plane XR orthogonal or substantially orthogonal to the plane of the illuminated surface W.

In one or more embodiments, the optical system (e.g. lens 16) may be configured so that it has an input surface 161 for the light radiation coming from guide member 14, and an output surface 162 from which the light radiation is projected outwards from device 100.

In one or more embodiments, optical system 16 may be implemented as a lens (e.g. including one of the light permeable materials mentioned in the foregoing) having a free form.

For example, in one or more embodiments, lens 16 may have a radiation input surface 161 (facing output end 14b of guide member 14) adapted to extend dome-like, e.g. as a spherical dome. Moreover, a general concavity is present having a centre or focus generally located in the region of output end 14b of guide member 14.

In one or more embodiments, the lens (optical system) 16 may be considered as ideally divided into a plurality of sectors (e.g. eight sectors) S1, . . . , S8, distributed along an angular range (which is ideally centred in the region of output end 14b of guide member 14) with respect to reference plane XR.

Moreover, for example:

sectors S1, S2, S3, . . . have increasing distances from reference plane XR towards sector S8, which is the most angularly distant sector from plane XR, and/or sectors S1, S2, S3, . . . have monotonously increasing thicknesses (i.e. distances between input surface 161 and output surface 162 of lens 16) moving away from reference plane XR.

It will be appreciated that sectors S1, . . . , S8 are used herein mainly as virtual geometrical figures, in order to describe the different behaviour of different regions of lens 16: in other words, such sectors do not represent actual partitions between different sectors. The reference to said sectors (the number whereof is chosen by way of example only) simply aims at exemplifying the possibility, for an optical system 16 according to one or more embodiments, of sending back the outgoing light radiation from the guide members 14 of the various emitters 10 included in device 100 towards different areas of the illuminated surface W, said different areas being denoted in FIG. 15 with corresponding references W1, W2, W3, . . . , W8.

By way of example, it will be assumed therefore that the light radiation output from guide member 14 (end 14b) and impinging on the input surface 161 of lens 16 is sent back, from output surface 162 of lens 16:

towards portion W1 of surface W, if impinging at sector S1, towards portion W2 of surface W, if impinging at sector S2, towards portion W3 of surface W, if impinging at sector S3, and so on up to the radiation sent back towards portion W8 of surface W, if impinging at sector S8.

In addition, FIG. 15 highlights that the various regions or portions W1, W2, . . . , W8 may have overlapping areas due to the uninterrupted development of sectors S1, . . . , S8, which are continuous with each other.

In one or more embodiments (as schematically exemplified at T4 and T5 of FIG. 6) the various sectors S1, . . . , S8 are connected at the output surface 162 at conditions wherein the (first) derivative of surface 162 (geometric tangent) at the beginning of a given sector (e.g. sector S5) has the same value as the derivative of the surface at the end adjoining the previous sector (e.g. sector S4).

Figure 4:
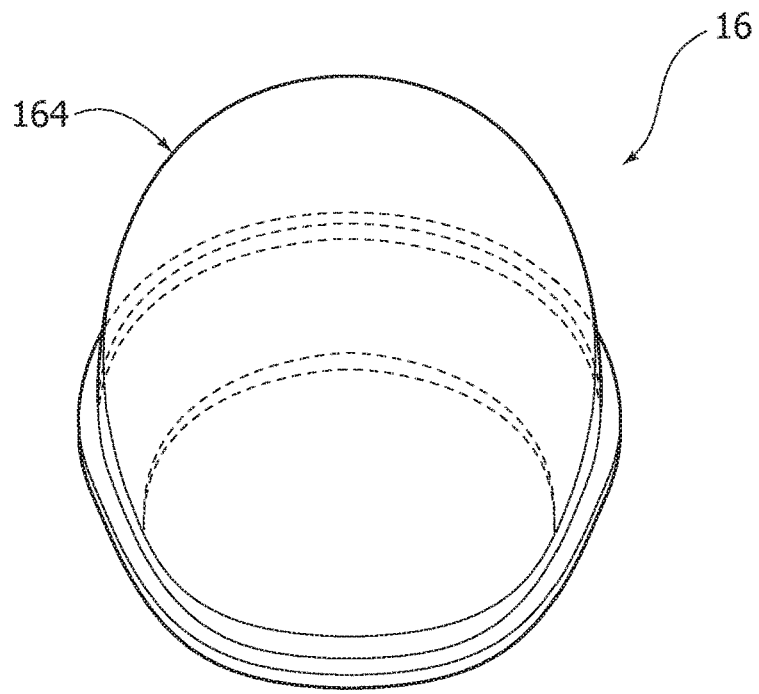
Figure 5:
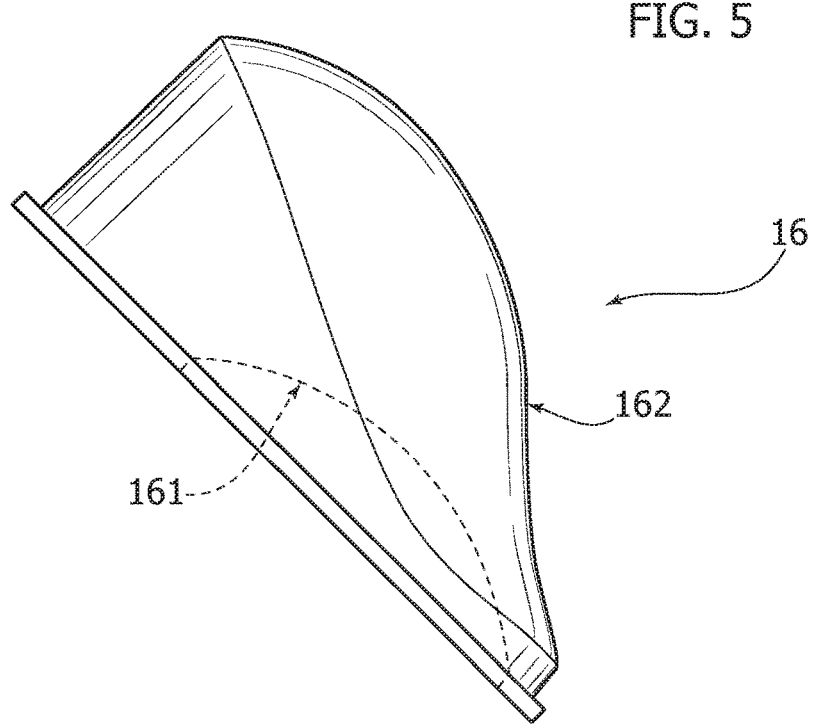
Figure 6:
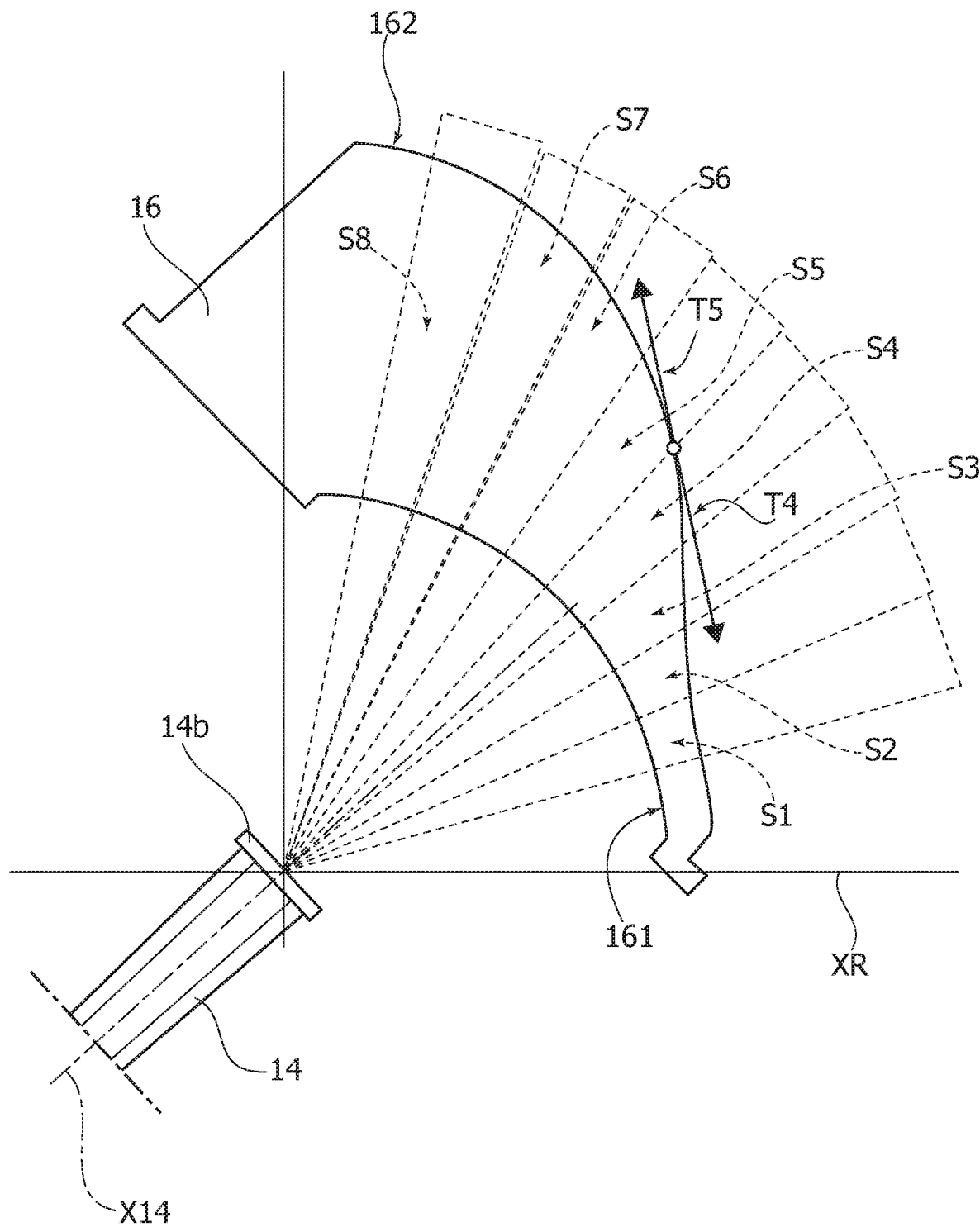
Figure 7:
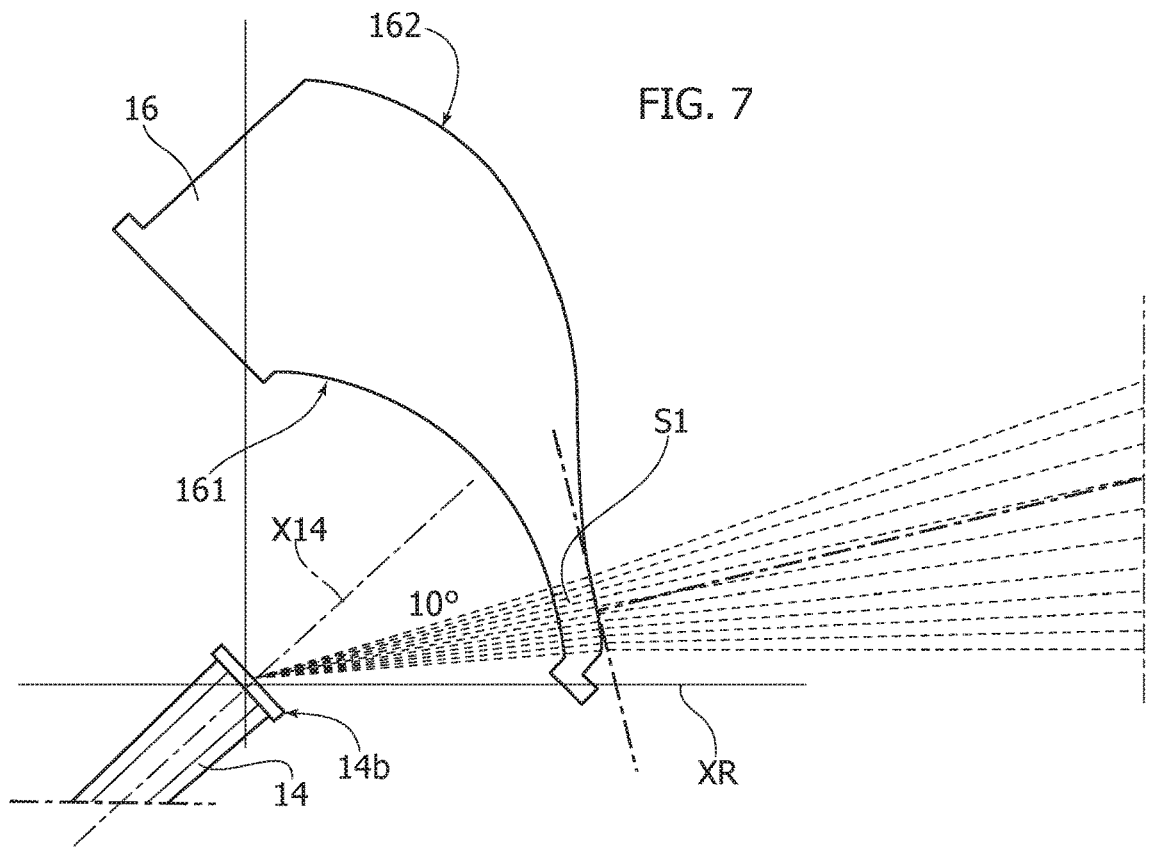
FIGS. 7 to 14 are exemplary diagrams of the implementation criteria of one or more embodiments, and FIGS. 15 to 19 exemplify possible uses of one or more embodiments and possible achievable results.

In one or more embodiments (see for example FIG. 4), the "transversal" shape of output surface 164 of the lens may be continuously interconnected, the possible condition being imposed, in one or more embodiments, that the optical system performs, in said transverse direction, a widening of the light radiation. In this way, in one or more embodiments a uniform distribution may be achieved on an angular range having an extension—defined as the width of the portion of illuminated surface W—which approximately corresponds to the distance of device 100 from the plane of surface W.

FIGS. 7 to 14 exemplify—from an essentially qualitative point of view—the possible behaviour of optical system 16 (exemplified herein by sectors S1 to S8, ideally defined in the foregoing) towards corresponding light radiation output beams from member 14, having an angular width (in the plane of the drawing of FIGS. 7 to 14) of 10°.

FIGS. 7 to 14 exemplify the possible behaviour of the optical system 16 towards eight possible different beams (having a cone angle amounting to 10°) which enter lens 16 through surface 161 and cross lens 16 at the various sectors S1, S2, . . . , S8.

Figure 14:
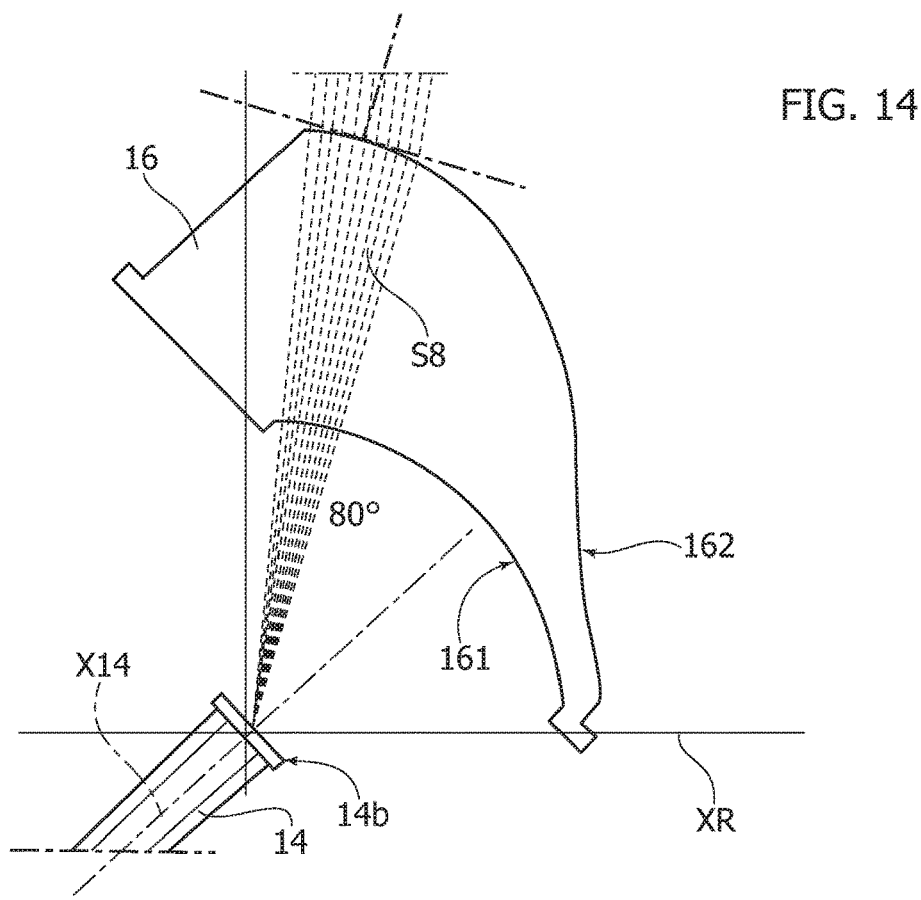

To this end, FIGS. 7 to 14 refer to possible different values of the angle of incidence (referred to plane XR and measured at the bisector of the opening angle of each beam) at which said beams enter lens 16 through input surface 161, said values increasing, by successive steps of 10°:
from 10° (beam crossing sector S1—FIG. 7)
to 80° (beam crossing sector S8—FIG. 14).

The following Table exemplifies, as a function of said tilting angles 10°, 20°, . . . 80° from plane Xr and therefore of the related sector S1, . . . , S8 of optical system 16:

the (mean) values of the corresponding angle—always referred to plan XR—at which the corresponding beam exits lens 16 at surface 162; and the value of divergence (in degrees) of said corresponding beam exiting lens 16.

| (Mean) Input Tilting | Crossed sector | (Mean) Output tilting - Approximate value | Divergence - Approximate value |
|---|---|---|---|
| 10° | S1 | 10° | 18° |
| 20° | S2 | 32° | 22° |
| 30° | S3 | 42° | 18° |
| 40° | S4 | 60° | 14° |
| 50° | S5 | 70° | 10° |
| 60° | S6 | 70° | 10° |
| 70° | S7 | 80° | 3° |
| 80° | S8 | 80° | 2° |

In short, as may be appreciated from FIGS. 7 to 14, in one or more embodiments the optical system 16 may be implemented in such a way as to obtain, on the light radiation coming from guide member 14, a "deviating" or "deflecting" action so as to generally increase—in the passage from input to output of system 16—the angle of light radiation to reference plane R (the values in the third column of the Table are generally higher than in the first column) and, at the same time, to generally decrease the divergence of the various optical beams for the highest deflection values (see e.g. the divergence values of 3° and 2° for output angles of 80°).

The overall achievable effect in one or more embodiments is shown in FIG. 16, which exemplifies a possible distribution of the lighting intensity (in Lux, on the abscissa axis) detected in a central position (value x=0 of the abscissa axis in FIG. 15) in the central direction of extension of surface W.

FIG. 16 exemplifies that such lighting intensity may have a maximum value near the mounting position of device 100 (the illustration of FIG. 15 is merely exemplary) and may decrease gradually, in a substantially linear fashion, moving away from the mounting position of device 100.

Figure 19:
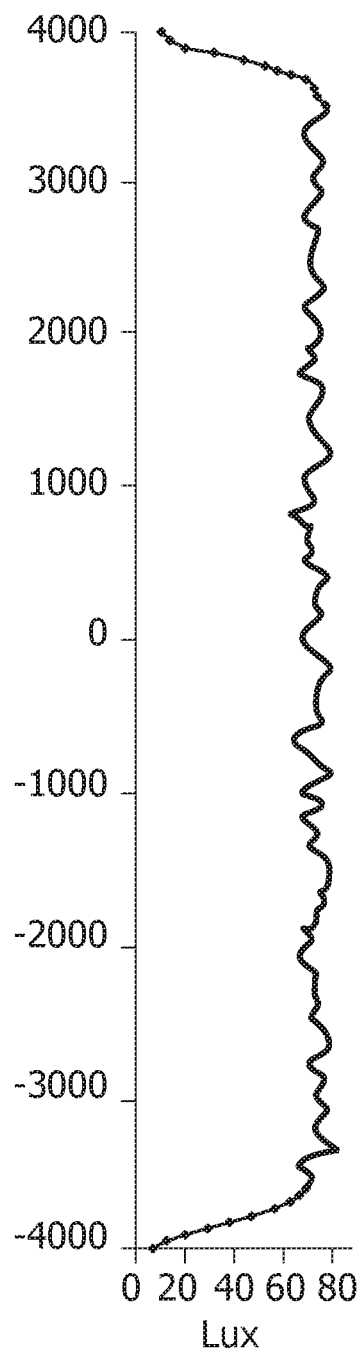

FIG. 19 exemplifies, with reference to a possible mounting position of two devices 100 as exemplified in FIG. 18, the possibility of taking advantage of said linear distribution by positioning two devices 100 as exemplified herein at the opposed ends of surface W: in this way, the respective illuminance distributions (each having a pattern as exemplified in FIG. 16) may have mirror-symmetrical arrangements and may be overlapping.

In one or more embodiments, said illuminance distributions may therefore be summed with each other and originate a distribution as exemplified in FIG. 19: in this case, the abscissa axis represents once again the lighting value in Lux, and the ordinate axis represents the extension of surface W.

Therefore, FIG. 19 exemplifies the possibility, in one or more embodiments, of achieving a high uniformity of said illuminance distribution.

One or more embodiments may therefore concern a lighting device (e.g. 100), including a linear array of light radiation emitters (e.g. 10), wherein:

a) the light radiation emitters in the array include:
an electrically-powered light radiation source (12),
a light guide member (e.g. 14) having a first end (14a) coupled with the light radiation source to receive a light radiation therefrom, and a second end (14b) to emit light radiation guided by the light guide member along a guide axis (e.g. X14), and
an optical system (with one lens 16 or one reflector) to receive light radiation from the light guide member and project outgoing light radiation from the lighting device, b) the light guide members of the light radiation emitters in the array are arranged with their second ends aligned in a longitudinal direction (e.g. z in FIG. 2) of the array, and with their light guide axes lying in a common plane angled to a reference plane (e.g. XR), c) the optical systems of the light radiation emitters in the array are configured (see for example sectors S1, . . . , S8) for producing, from input beams of said light radiation, output beams of said outgoing light radiation exhibiting higher angles to said reference plane than said input beams (see for example FIGS. 7 to 14).

In one or more embodiments, said output beams may have decreasing divergence over the upper range of said angular values (see for example the values of divergence amounting to 3° and 2° for output angles of 80° as per the foregoing Table).

Stated otherwise, in one or more embodiments, said output beams may have a distribution of said higher angles from a lower range facing said reference plane (XR) to an upper range opposed said reference plane (XR) with decreasing divergence from the lower range towards the upper range of said higher angles.

One or more embodiments may enable the achievement of an illumination law (distribution) of the illuminated surface which decreases linearly as the light angle increases (see e.g. FIG. 16). This may constitute a difference from known solutions having a very high lighting intensity near the lighting device, which decreases rapidly and non-linearly as the light angle increases.

One or more embodiments may therefore contemplate configuring the optical system in said at least one lighting device to give rise to an illuminance distribution over the illuminated surface (W) which decreases linearly from the region of the illuminated surface (W) facing the at least one lighting device (see, for instance, FIG. 16).

In one or more embodiments, the optical systems of the light radiation emitters in the array may include a plurality of optical sectors (e.g. S1, . . . , S8) distributed over an angular range with respect to said reference plane.

In one or more embodiments, the light radiation emitters in the array may include multi-coloured light radiation sources.

In one or more embodiments, the light radiation emitters in the array may include light guide members facilitating mixing of light radiation propagated along said guide axis.

In one or more embodiments, the light radiation emitters in the array include light guide members which may have:
a polygonal cross-section, optionally triangular, rectangular, square or hexagonal, and/or
a tapered shape with the first end narrower than the second end.

In one or more embodiments, the light radiation emitters in the array may light guide members including light guide rods or tunnels.

In one or more embodiments, the optical systems of the light radiation emitters in the array may include lenses (e.g. "free form" lenses) having refractive sectors (e.g. S1, . . . , S8) of different thicknesses, optionally with increased thickness moving away from said reference plane.

In one or embodiments, the sectors in said plurality of optical sectors may adjoin (see e.g. T4, T5 in FIG. 6) in the absence of discontinuities, at least at the output surface (e.g. 162) of the lens.

In one or more embodiments, the light radiation emitters in the array may include solid-state light radiation sources, such as LED sources.

In one or more embodiments, a method of lighting a surface (e.g. planar, W) may include arranging at least one lighting device according to one or more embodiments in a position facing said surface, with said reference plane arranged transversally of said surface.

One or more embodiments may include arranging the guide axes (e.g. X14) of the light guide members of the light radiation emitters in the array at an angle of about 45° to said reference plane.

The previously mentioned fact that one or more embodiments may enable achieving an illuminance law (distribution) of the illuminated surface which decreases linearly as the light angle increases helps achieving a uniform illuminance distribution on the illuminated surface by employing one (or more) unit(s) positioned on the floor and one (or more) further unit(s) specularly placed on the ceiling.

For example, in one or more embodiments, a method for lighting a surface having opposed ends may include arranging a pair of lighting devices according to one or more embodiments at said opposed ends of said surface, with the lighting devices in the pair arranged symmetrical to each other and directing their light radiation towards each other.

In that way—with a law (distribution) of illuminance of the illuminated surface which, for each device 10, 100 in the pair, decreases linearly from the region of the illuminated surface facing the device (see for instance FIG. 16)—the total distribution resulting from the superposition (sum) of the two linearly decreasing distributions (that is with the triangular shape exemplified in FIG. 16) is substantially uniform (constant), as exemplified in FIG. 19.

Without prejudice to the basic principles, the implementation details and the embodiments may vary, even appreciably, with respect to what has been described herein by way of non-limiting example only, without departing from the extent of protection.

The extent of protection is defined by the annexed claims.

The invention claimed is:
1. A lighting device, including a linear array of light radiation emitters, wherein:
a) the light radiation emitters in the array include:
an electrically-powered light radiation source,
a light guide member having a first end coupled with the light radiation source to receive a light radiation therefrom and a second end to emit light radiation guided by the light guide member along a guide axis, and
an optical system to receive light radiation from the light guide member and project outgoing light radiation from the lighting device,
b) the light guide members of the light radiation emitters in the array are arranged with their second ends aligned in a longitudinal direction of the array and with their light guide axes lying in a common plane angled to a reference plane,
c) the optical systems of the light radiation emitters in the array are configured for producing from light radiation input beams output beams in said outgoing light radiation with higher angles to said reference plane than said input beams; wherein the optical systems in the light radiation emitters in the array comprise lenses having refractive sectors of different thicknesses.

2. The lighting device of claim 1, wherein said output beams have a distribution of said higher angles from a lower range facing said reference plane to an upper range opposed said reference plane with decreasing divergence from the lower range towards the upper range of said higher angles.

3. The lighting device of claim 1, wherein the optical systems of the light radiation emitters in the array include a plurality of optical sectors distributed over an angular range with respect to said reference plane.

4. The lighting device of claim 1, wherein the light radiation emitters in the array include multi-coloured light radiation sources.

5. The lighting device of claim 1, wherein the light radiation emitters in the array include light guide members facilitating mixing of light radiation propagated along said guide axis.

6. The lighting device of claim 1, wherein the light radiation emitters in the array include light guide elements having:
a polygonal cross-section, preferably triangular, rectangular, square or hexagonal, and/or
a tapered shape with the first end narrower than the second end.

7. The lighting device of claim 1, wherein the light radiation emitters in the array include rod-like or tunnel-like light guide members.

8. The lighting device of claim 1, wherein the light radiation emitters in the array include solid-state light radiation sources.

9. The lighting device of claim 1, wherein the optical sectors in said plurality of optical sectors adjoin in the absence of discontinuities, at least at the output surface of the lens.

10. A method of lighting a surface having opposed ends, the method comprising:
arranging a pair of lighting devices at the opposed ends of the surface; wherein each lighting device comprises an array of light radiation emitters;
wherein each light radiation emitter comprises:
an electrically-powered light radiation source;
a light guide member having a first end coupled with the light radiation source to receive a light radiation therefrom and a second end to emit light radiation guided by the light guide member along a guide axis;
an optical system to receive light radiation from the light guide member and project outgoing light radiation from the lighting device;
wherein the light guide members of the light radiation emitters of the array are arranged with their second ends aligned in a longitudinal direction of the array and with their light guide axes lying in a common plane angled to a reference plane;
wherein the optical systems of the light radiation emitters of the array are configured to produce output beams in said outgoing light radiation with higher angles to said reference plane than light radiation input beams;
arranging the pair of lighting devices with said array extending facing the surface with said reference plane arranged transversally of said surface and the lighting devices in the pair arranged symmetrical to each other and directing their light radiation towards each other;
configuring the optical system in the lighting devices to output an illuminance distribution over the illuminated surface that decreases linearly from the region of the illuminated surface facing the lighting device.

11. The method of claim 10, wherein the light radiation emitters in the array include solid-state light radiation sources.

12. The method of claim 10, comprising arranging the light guide axes of the light guide members in the light radiation emitters in the array at an angle of about 45° to said reference plane.

13. The method of claim 10, wherein the optical systems in the light radiation emitters in the array include lenses having refractive sectors of different thicknesses.

14. The method of claim 13, wherein the optical sectors in said plurality of optical sectors adjoin in the absence of discontinuities, at least at the output surface of the lens.

15. The method of claim 10, wherein said output beams have a distribution of said higher angles from a lower range facing said reference plane to an upper range opposed said reference plane with decreasing divergence from the lower range towards the upper range of said higher angles.

16. The method of claim 10, wherein the optical systems of the light radiation emitters in the array include a plurality of optical sectors distributed over an angular range with respect to said reference plane.

17. The method of claim 10, wherein the light radiation emitters in the array include multi-coloured light radiation sources.

18. The method of claim 10, wherein the light radiation emitters in the array include light guide members facilitating mixing of light radiation propagated along said guide axis.

19. The method of claim 10, wherein the light radiation emitters in the array include light guide elements having:
a polygonal cross-section, preferably triangular, rectangular, square or hexagonal, and/or
a tapered shape with the first end narrower than the second end.

20. The method of claim 10, wherein the light radiation emitters in the array include rod-like or tunnel-like light guide members.

* * * * *